June 13, 1961 K. GEBELE 2,987,978
PHOTOGRAPHIC SHUTTER AND LENS ASSEMBLY
Filed March 23, 1956 3 Sheets-Sheet 1

June 13, 1961 K. GEBELE 2,987,978
PHOTOGRAPHIC SHUTTER AND LENS ASSEMBLY
Filed March 23, 1956 3 Sheets-Sheet 2

United States Patent Office 2,987,978
Patented June 13, 1961

2,987,978
PHOTOGRAPHIC SHUTTER AND LENS ASSEMBLY
Kurt Gebele, Munich, Germany, assignor to Compur-Werk Friedrich Deckel O.H.G., Munich, Germany, a firm of Germany
Filed Mar. 23, 1956, Ser. No. 573,546
Claims priority, application Germany Mar. 25, 1955
4 Claims. (Cl. 95—53)

The present invention relates to a shutter and lens assembly or unit for use on a photographic camera.

An object of the invention is the provision of a generally improved and more satisfactory unit or assembly of this kind.

Another object is the provision of a lens and shutter assembly which is particularly strong and sturdy and which is so constructed that the weight of the lens parts, even if rather heavy, does not cause undesirable stress on or deflection of the shutter parts.

Still another object is the provision of an assembly or unit so constructed that, with relatively few and easily manufactured parts, the weight of one or more lenses mounted in front of the shutter is supported at least partly from the front wall of the camera body independently of the shutter casing, thus avoiding undue stress on the shutter casing.

A further object is the provision of a simple and compact shutter and lens assembly in which at least one lens member is replaceable or interchangeable, so constructed that the replaceable lens member is accurately and dependably centered on the optical axis.

A still further object is the provision of a construction fulfilling the above objects and which, at the same time, is suitable for use with a shutter of the conventional annular kind.

A still further object of the invention is the provision of an assembly or unit which is so designed as to permit the use of shutters of relatively large diameter.

These and other desirable objects may be attained in the manner disclosed as an illustrative embodiment of the invention in the following description and in the accompanying drawings forming a part hereof, in which.

The same reference numerals throughout the several views indicate the same parts.

Figure 1:
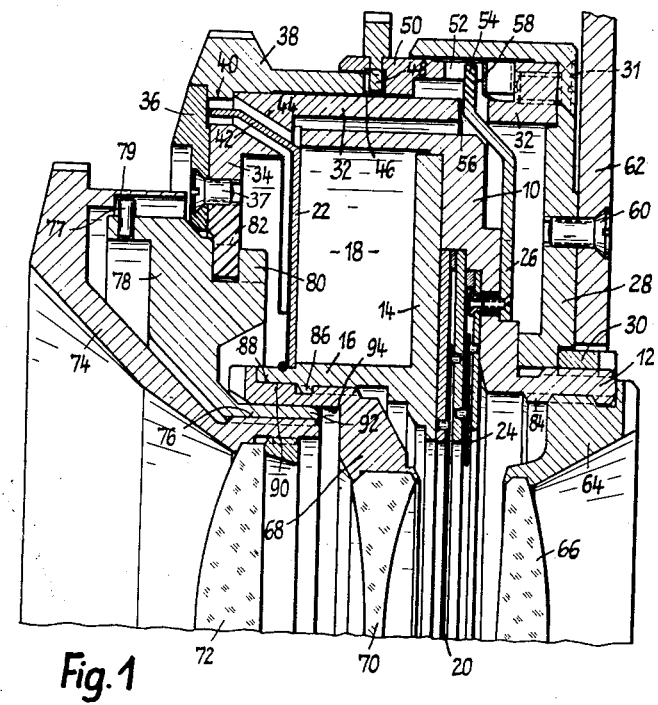
FIG. 1 is an enlarged radial section taken axially through a shutter and lens assembly according to a preferred embodiment of the invention and through a fragment of the front wall of a camera body on which the shutter and lens assembly is mounted.

Referring first to FIG. 1, the preferred embodiment comprises a shutter housing or casing 10 of the customary circular annular shape as commonly found in modern objective shutters, the housing including a rear lens tube 12 concentric with the optical axis and projecting rearwardly from the main rear wall of the housing. A mounting plate or mechanism plate 14, secured in fixed position within the housing, carries the front lens tube 16, also concentric with the optical axis. In the annular space 18 between the lens tube 16 and the outer cylindrical wall of the shutter housing there is arranged the usual shutter operating and controlling mechanism for driving, at properly controlled speed, the shutter blades 20 to open and close the exposure aperture extending along the optical axis. In a well known manner (as disclosed in detail, for example, in Deckel and Geiger Patent 1,687,123) the speed at which the blades are opened and closed, and the duration of the exposure, are adjusted by turning a speed setting ring 22 rotatably mounted at the front of the shutter housing to turn on the lens tube 16. The shutter also includes an adjustable iris diaphragm or stop comprising leaves or blades 24 adjusted by turning a diaphragm adjusting ring 26 mounted on a circular shoulder at the rear of the shutter housing, for turning about the optical axis as a center of rotation.

The shutter parts thus far described are conventional, and may be constructed as disclosed in said Deckel and Geiger patent or in any known form of objective shutter having a generally similar annular casing. The exact details of the shutter construction are not important for purposes of the present invention. Thus the present invention may utilize any one of various known forms of objective shutter, without the necessity and expense of special tooling for special designs of shutters.

According to the present invention, an annular plate 28, somewhat L-shaped in radial section, having a rear wall and a forwardly extending marginal flange at the outer edge of the rear wall, is arranged concentric with the optical axis at the rear of the shutter housing and is mounted on the rear lens tube 12 and fixed thereto by a nut 30 screwed onto external threads on the tube 12. Projecting forwardly from this plate 28 within the marginal flange or rim thereof, and secured to it by a series of screws 31 spaced at intervals circumferentially around the construction, is a rigid tubular support 32 which surrounds the shutter housing 10 and which has an inwardly extending radial flange 34 at its forward end, overlying the front of the shutter housing.

The flange 34 supports the ring-shaped front plate 36 fixed to the flange by a series of screws 37 circumferentially spaced. The externally accessible and manually operable shutter speed setting ring 38 rotates concentrically with the optical axis on an exterior cylindrical surface of the tubular member 32, and is held against axial movement by an internal rib of the setting ring snugly but rotatably engaged in a recess between a forwardly faced shoulder on the member 32 and the rear face of the front plate 36. At one point this internal rib of the setting ring 38 has a notch 40 snugly engaged by the end of an angular extension arm 42 formed on the internal shutter speed setting ring 22 and extending through a circumferential slot 44 in the member 34. Thus any rotary movement imparted to the external speed setting ring 38 causes corresponding rotary movement of the ring 22, to adjust the speed or duration of exposure.

On the rear edge of the setting ring 38 there is a series of coupling notches 46, which may be engaged by a coupling tooth 48 on a coupling ring 50 which is both rotatable and axially slidable on a cylindrical surface of the member 32. An annular corrugated spring 58, mounted behind the coupling ring 50 and pressing forwardly on its rear edge, tends to keep the tooth 48 engaged in the notch 46 in which it happens to be seated, but the entire coupling ring may easily be pressed rearwardly against the resilient action of the spring, to disengage the tooth from the notches, whereupon the rings 38 and 50 may be turned independently of each other to a new position of orientation relative to each other, and may be coupled to each other in this new position by allowing the spring to move the ring 50 axially forwardly again.

A driver slot 52 extending in an axial direction in the coupling ring 50 is engaged by a driver tongue 54 formed on an arm of the diaphragm aperture setting ring 26 and passing out through an arcuate slot 56 in the member 32, so that whenever the coupling ring 50 is turned, the ring 26 turns with it and the diaphragm aperture is correspondingly adjusted. When the tooth of the coupling ring 50 is engaged in one of the notches of the speed adjusting ring 38, the two rings will turn together and any adjustment of shutter speed will be accompanied automatically by a compensating adjustment of diaphragm aperture in a complementary manner, the internal parts of the speed adjusting mechanism and the aperture adjusting mechanism being proportioned, in known manner, so that if a given angular movement of the member 22 serves to double the duration of exposure, the same angular movement of the member 26 in the same direction serves to reduce the area of the diaphragm aperture by one-half, and vice versa. By placing the coupling tooth 48 in a different one of the notches 46, the relationship between shutter speed and diaphragm aperture may be altered at will.

In this embodiment of the invention, the rear wall 28 of the shutter and lens assembly is permanently connected to the front wall 62 of the camera body by means of a few screws 60 circumferentially spaced at intervals around the optical axis. It is possible, however, to have a detachable connection (e.g., a bayonet joint connection) between the shutter and lens assembly or unit and the camera body, an example of this being illustrated in connection with another embodiment described below.

The rear lens tube 12 of the shutter is provided with internal screw threads 84, concentric with the optical axis. Into these threads is screwed a lens mounting ring 64 carrying a lens 66 which forms the rear component of the lens system. The front lens tube 16 of the shutter has a cylindrical internal seating face 88 at its forward end, and rearwardly of this an internal screw thread 86, both being concentric with the optical axis. Into the thread 86 is screwed a lens mounting ring 68 containing the lens component 70.

The front component 72 of the lens system is mounted for removal and replacement (that is, for interchangeability with other lenses) and also for axial movement for focusing. For this purpose, it is mounted in a lens mounting ring 74 which has near its rear end an external screw thread screwed into the internal thread 76 of a holder 78 which is stationary except when the lens is to be removed for replacement by a different lens. To move the lens 72 axially for focusing, the mounting ring 74 is turned by grasping a knurled rib which extends circumferentially around the forward end of the mounting ring, and this turning movement causes the ring to travel axially along the thread 76 of the holder 78. The maximum extent of axial displacement is limited by limiting the rotary movement to less than one complete revolution, by means of a stop pin 77 on the holder 78, which engages the ends of a slot 79 which extends circumferentially through part of the periphery of a flange forming part of the ring 74 and extending rearwardly in surrounding relation to the holder 78.

The holder 78 itself is detachably connected to the rest of the unit or assembly by means of bayonet lugs 80 on the holder interengaging in known manner with bayonet slots 82 formed on the front flange 34 of the tubular support 32. In the position shown, the parts 78 and 34 are firmly engaged with each other. But when the holder 78 is forcibly turned a fraction of a revolution, the bayonet lugs 80 are brought opposite the bayonet slots 82 so that they may pass through the same, in the familiar manner of bayonet connections. The holder 78 and the lens mounting ring 74 and lens element 72 may then be removed and replaced by a different lens (e.g., a telephoto lens or a wide angle lens) carried by a similar holder 78.

In order to assure accurate centering of all the lens components on the optical axis, the thread 84 of the rear lens tube 12, the thread 86 of the front lens tube 16, and the cylindrical centering surface 88 of the same are all produced during a single chucking of the shutter housing 10 in the course of the manufacturing operation, thus assuring true concentricity of these parts. When the mount 68 of the central lens element 70 is screwed into the screw thread 86, an external cylindrical surface 90 on this mount engages snugly in the centering surface 88 and furnishes a firm and accurately centered support for the forward end of the mount 68. An internal cylindrical surface 94 on the member 68 is concentric with the external surface 90 thereof, and engages snugly with the exterior cylindrical surface 92 of the rear flange of the holder 78. This portion 92 is directly opposite the screw thread 76 on which the mount 74 rides, so that there is an accurate centering of the front lens component notwithstanding any play or manufacturing inaccuracies in the bayonet connection parts 80, 82. Thus most of the parts of the assembly or unit may be manufactured in quantity by mass production methods, with consequent large tolerances or danger of inaccuracies, yet the lenses will be accurately centered on the optical axis if reasonable care is taken in manufacturing just a few parts which control the centering of the lenses and which are of such shape and form that it is relatively easy and inexpensive to manufacture them accurately.

The structure is particularly advantageous when using heavy lenses or lenses which project a considerable distance forwardly from the shutter and hence act with a long lever arm to produce a large bending moment. Although the front lens is centered from the shutter structure by the surfaces 88, 94, etc., yet the weight of the front lens and the bending moment produced thereby are transmitted entirely or mainly through the rigid tubular support 32, 34, direct to the camera wall 62 and not through the more delicate shutter structure. Also the rather severe stresses which sometimes occur when removing an interchangeable lens from or mounting it on the camera, are likewise taken mainly by the sturdy tubular support 32, 34 and the shutter is not seriously subjected to them.

Figure 2:
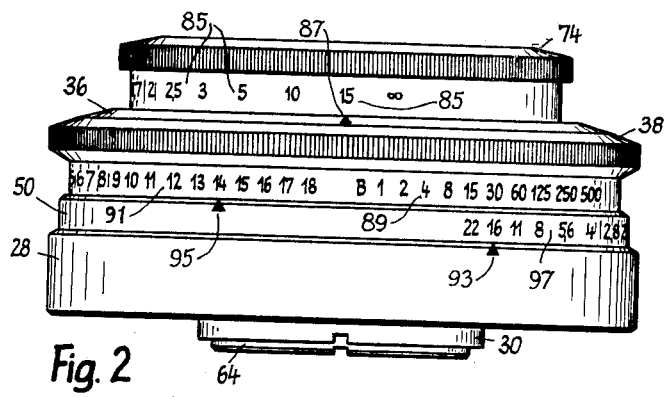
FIG. 2 is a top plan view of the shutter and lens assembly according to FIG. 1, removed from the camera body.

The arrangement of the various setting scales can best be noted from FIG. 2. The focusing distance scale (here graduated in meters, but it may equally well be graduated in feet or other units of distance) is shown at 85 and is placed on the periphery of the front lens mount 74. It is read in conjunction with a fixed pointer or reference mark 87 on the stationary cover plate 36. The shutter speed scale 89 and the exposure value scale 91 are both marked on the periphery of the speed adjusting ring 38. The former is read in conjunction with a pointer or reference mark 93 on the fixed cylindrical flange of the member 28, which mark serves also for reading the diaphragm aperture scale 97 marked on the periphery of the coupling ring 50. The exposure value scale 91 is read in conjunction with a pointer or reference mark 95 on the coupling ring 50.

Figure 3:
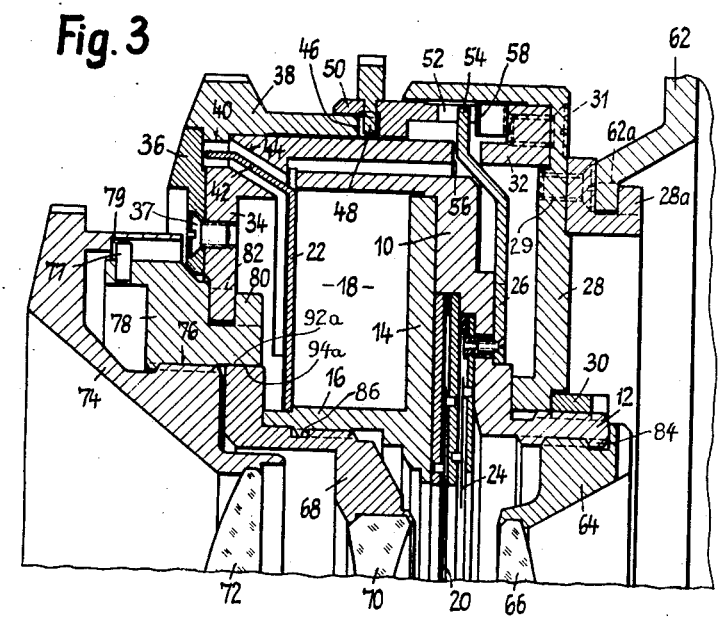
FIG. 3 is a view similar to FIG. 1, showing a second embodiment of the invention.

In some cases, it may be desirable to make the front lens 72 of such large size that there is no longer sufficient room for the flange which carries the centering surface 92 as in the previous embodiment. When this is desired, the parts may be slightly rearranged as shown in Fig. 3, where the centering surface 92a of the member 78 is now of larger diameter than the previous surface 92, and now lies in front of the annular part 18 of the shutter housing, instead of inside the front lens tube 16. This surface 92a (cylindrical and concentric with the optical axis of the lens system) mates with and is centered by the external cylindrical surface 94a at the front end of the mount 68, which mount is centered from the front lens tube 16 by means of the surfaces 88 and 90, just as before. The thread 76, on which the mount 74 travels when turned for focusing, is now arranged on the member 78 in front of the centering surface 92a. The various other parts of the unit or assembly may be arranged the same as before, and are identified by the same reference numerals.

FIG. 3 also illustrates another possible variation, this time with respect to the mounting of the lens and shutter assembly on the camera body. In the previous embodiment, the back wall 28 of the assembly was fixedly secured to the camera body 62 by screws 60. It is possible, however, to secure the wall 28, not direct to the camera body 62, but rather to a bayonet ring 28a, concentric with the optical axis, by means of screws 29. The bayonet lugs on this ring 28a are detachably engaged, in the usual bayonet connection fashion, with the mating bayonet lugs interspersed between bayonet slots 62a formed on a forwardly extended portion of the front wall 62 of the camera. In this way, the entire shutter and lens assembly may be interchangeably mounted on the camera body, in addition to the possibility of interchanging the front lens component with respect to the rest of the assembly.

A similar interchangeable bayonet mounting may be used for fastening any of the other forms of shutter and lens assemblies to the camera body, or any of the other forms may be fastened permanently to the camera body, if the interchangeable feature is not desired.

Figure 4:
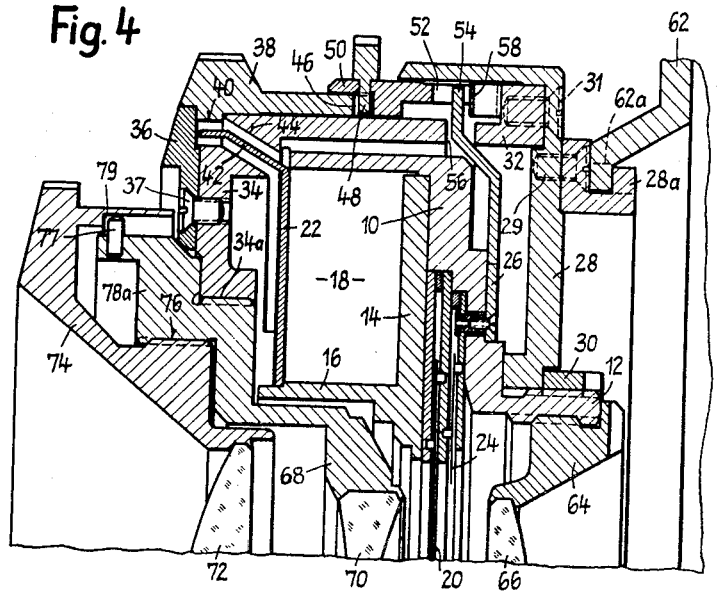
FIG. 4 is a similar view, showing a third embodiment of the invention.

In both forms of construction described above, the lens holding and centering arrangement was used in connection with a front lens element which was interchangeable. It is equally within the scope of the present invention, however, to use the lens holding and centering structure when the assembly has no interchangeable lenses. An example of this is illustrated in FIG. 4, in which the lens mounting member 78a corresponds in general to the mount 78 in FIG. 3, but is permanently supported from the member 34 by the screw threads 34a, the detachable bayonet connection parts 80, 82 being omitted. Since the member 78a stays permanently with the assembly, there is no occasion for separating it from the lens 70. Hence the mount 68 of the lens 70 is now formed integrally with the mount 78a. The centering contact between the mount 68 and the lens tube 16 can be eliminated if desired, the two lenses 70 and 72 then being centered from and entirely supported by the tubular structure 32, 34. The other parts may be the same as previously described, and bear the same reference numerals.

There are some cases in which it is desirable to make the rear lens component 66 of somewhat larger diameter than that shown in the embodiments according to FIGS. 1, 3, and 4. When this is the case, the construction shown in FIG. 5 may be used. Here, the rear lens tube 12 is entirely omitted, and instead of supporting the shutter housing 10 from the rear lens tube, it is now supported by screws 30a which connect the rear face of the shutter housing directly against the plate 28. The rear lens member 66 is now supported from a lens mounting ring 64a having a lens receiving orifice of larger diameter than that in the corresponding previous mounting ring 64. The mount 64a flares rearwardly and outwardly to an exterior screw thread which is screwed into a corresponding internal thread of a rearwardly extending annular flange (concentric with the optical axis) formed on the plate 28, as will be readily understood from an inspection of FIG. 5.

Figure 5:
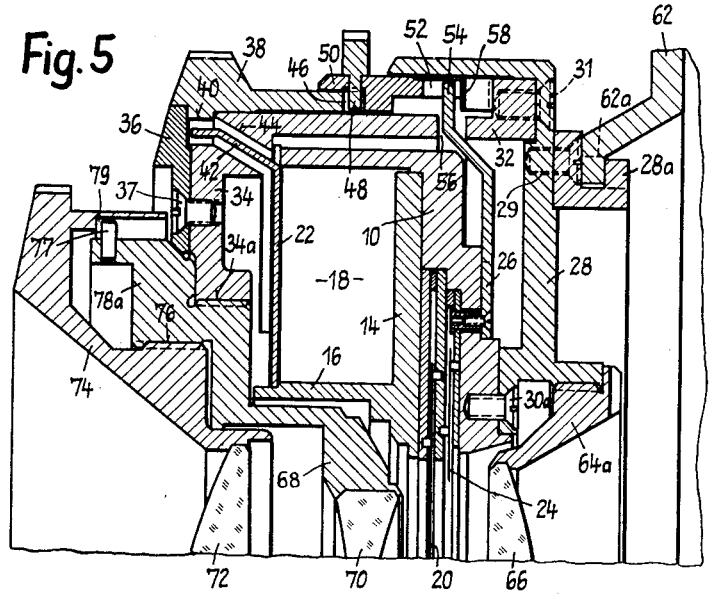
FIG. 5 is a similar view, illustrating a fourth embodiment.

In this embodiment according to FIG. 5, all three of the lens components 66, 70, and 72 are carried by the supplementary structure composed of the plate 28 and the tubular member 32, 34. No lens element is supported, in this embodiment, from the shutter housing itself. In the previous embodiments, at least one lens component (in FIG. 4) or usually two components (FIGS. 1 and 3) are supported from the shutter housing.

Figure 6:
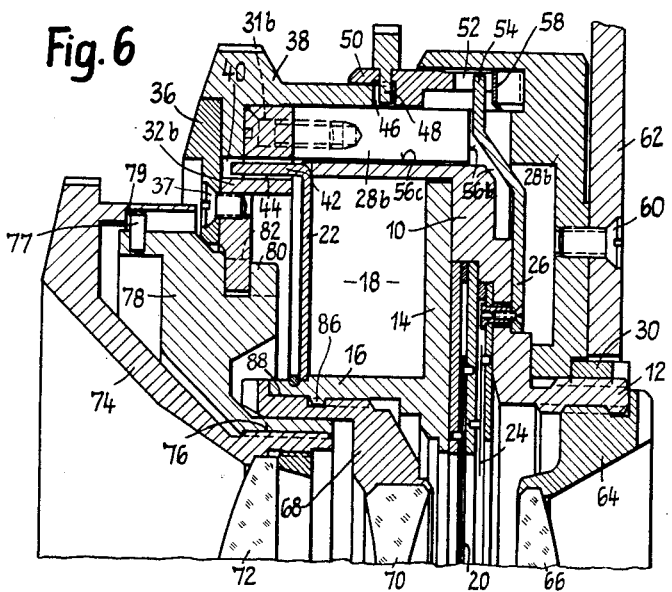
FIG. 6 is a similar view of a fifth embodiment.

If it is inconvenient to make the supplementary supporting structure 28, 32, 34 of a single piece, it may be made of any desired number of individual pieces suitably joined together at joint lines conveniently chosen depending upon the requirements for assembly of the parts within. In FIG. 6 there is shown an example of a somewhat different form of supporting structure, divided or parted along different lines from those employed in the embodiments of FIGS. 1–5.

In this example shown in FIG. 6, the line of parting or separation of the supporting structure lies in front of the shutter, in distinction to the previous embodiments where the line of separation lies behind the shutter (between the parts 28 and 32). Here, the forwardly extending tubular part is integral with the back plate, now designated by the numeral 28b, while the front plate, here designated as 32b, is separate from the forwardly extending tubular part and is held thereto by the screws 31b. The arcuate slot 56b in the part 28b allows passage of the operating arm on the diaphragm aperture adjusting ring 26. In order to be able to introduce this arm into the assembly, a large axial assembly slot 56c is provided, in the member 28b, the rear end of the slot 56c opening into the arcuate slot 56b. Otherwise the construction is essentially the same as before, and the corresponding parts are indicated by the same reference numerals.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera comprising a camera body having a front wall, a supporting structure of substantially annular form including a rear plate mounted on the front wall of said camera body and also including a tubular support projecting forwardly therefrom, an annular objective shutter having a shutter housing, means for mounting said shutter housing on said supporting structure, the forward end of said supporting structure lying ahead of the front of said shutter housing, and at least one lens mount lying partly within said shutter housing and supported at least partly from the forward end of said supporting structure.

2. A photographic camera comprising a camera body having a front wall, a supporting structure of substantially annular form including a front flange and a rear plate and a tubular support extending therebetween, means for mounting the rear plate of said supporting structure on the front wall of said camera body about an optical axis, an annular objective shutter having a shutter housing, means for mounting said shutter housing about the optical axis on and within said supporting structure, the front flange of said supporting structure lying ahead of the front of said shutter housing, at least one lens mount lying partly within said shutter housing and supported at least partly from the front flange of said supporting structure in such manner that the weight of said lens mount is carried mainly by said supporting structure without causing substantial stress in said shutter housing, and cooperating interengaging parts on said lens mount and said shutter housing for centering said lens mount accurately on the optical axis.

3. A photographic camera including a camera body having a front wall, a supporting structure of substantially annular form including a rear plate mounted on the front wall of said camera body about an optical axis and also including a tubular support projecting forwardly therefrom, an annular objective shutter having a shutter housing and a forward lens tube, means for mounting said shutter housing about the optical axis on the rear plate of said supporting structure lying within the tubular support thereof, a stationary lens mount carried by said shutter housing near the front thereof, a movable lens mount carried by said front flange of said supporting structure for holding a lens in front of the lens held by said stationary lens mount, the weight of said movable lens mount being carried substantially entirely by said supporting structure without causing substantial stress in said shutter housing, and cooperating interengaging means on said two lens mounts for centering one relative to the other.

4. A photographic camera including a camera body having a front wall, a supporting structure of substantially annular form including a rear plate mounted on the front wall of said camera body and a forwardly extending tubular support, an annular objective shutter having a shutter housing and an optical axis, means for mounting said shutter housing on and within said supporting structure, a plurality of lens elements alined with the optical axis of said shutter housing, interengaging bayonet connection means on said supporting structure for detachably holding at least one of said lens elements, said supporting structure including a front flange secured to the front end of said tubular support and extending inwardly toward the optical axis, in front of said shutter housing, a shutter speed setting ring surrounding and rotating on the tubular support of said supporting member, and a diaphragm aperture adjusting ring also surrounding and rotating on the tubular support of said supporting structure.

References Cited in the file of this patent

UNITED STATES PATENTS

| | | |
|---|---|---|
| 1,688,370 | Wittel | Oct. 23, 1928 |
| 2,087,020 | Colaiace | July 13, 1937 |
| 2,184,018 | Ort | Dec. 19, 1939 |
| 2,190,729 | Nerwin | Feb. 20, 1940 |
| 2,315,977 | Mihalyi | Apr. 6, 1943 |
| 2,439,087 | Harvey | Apr. 6, 1948 |
| 2,527,781 | Willcox | Oct. 31, 1950 |
| 2,649,024 | Goldhamer | Aug. 18, 1953 |
| 2,923,217 | Sauer | Feb. 2, 1960 |

FOREIGN PATENTS

| | | |
|---|---|---|
| 674,411 | Great Britain | June 25, 1952 |
| 288,180 | Switzerland | Jan. 15, 1953 |
| 1,071,762 | France | Mar. 10, 1954 |
| 1,111,448 | France | Oct. 26, 1955 |